United States Patent

[11] 3,601,362

| [72] | Inventor | Rush B. Gunther<br>Abington, Pa. |
|---|---|---|
| [21] | Appl. No. | 857,639 |
| [22] | Filed | Sept. 10, 1969 |
| [45] | Patented | Aug. 24, 1971 |
| [73] | Assignee | The Duriron Company, Inc.<br>Hatboro, Pa. |

[54] STOP FOR VALVE SHANK
5 Claims, 3 Drawing Figs.

[52] U.S. Cl.................................................. 251/285, 251/88
[51] Int. Cl.....................................................F16k 51/00, F16k 31/50
[50] Field of Search.......................................... 251/88, 215, 216, 284–288

[56] References Cited
UNITED STATES PATENTS

| 457,779 | 8/1891 | Hollingsworth | 251/285 |
| 585,687 | 7/1897 | Milner | 251/216 |
| 737,632 | 9/1903 | Jennings | 251/285 |
| 1,393,615 | 10/1921 | Foltz | 251/285 X |

*Primary Examiner*—Henry T. Klinksiek
*Attorney*—Zachary T. Wobensmith, 2nd

ABSTRACT: A stop for valve shanks for high pressure valves is provided which includes a stop element adjustably mounted on the valve shank and having a land for engagement with a shoulder on the valve gland or housing to prevent further turning for valve seating.

PATENTED AUG 24 1971　　3,601,362

INVENTOR
RUSH B. GUNTHER
BY
B. T. Wobensmith 2nd
ATTORNEY

STOP FOR VALVE SHANK

BACKGROUND OF THE INVENTION

1. Field of the Invention

This invention relates to valves and more particularly to stop mechanism which limits the extent of movement of the valve shank for tightening.

2. Description of the Prior Art

It has heretofore been proposed, as in the U.S. Pats. to Hollingsworth, No. 457,779, Milner, No. 585,687, Jennings, No. 737,632, and Foltz, No. 1,393,615, to provide stops for limiting the turning movement of a valve rod or stem but these had various shortcomings.

In valves for high pressure fluids of the order of 10,000p.s.i. and higher the "feel" as to tightness of the valve for closing cannot be relied upon. Overtightening of the valve stem can easily be effected with damage to the valve seat and no satisfactory provisions for overcoming this have been proposed for high pressure valves.

SUMMARY OF THE INVENTION

In accordance with the invention structure is provided for limiting the turning of the valve rod or stem which is particularly suited for high pressure valves for fluids of 10,000p.s.i. and higher, in which a stop element is adjustably mounted on the valve shank for engagement with a shoulder on the valve gland or housing, the height of the land being so related to the pitch of the threads on the valve rod that the first turn of the rod from a closed position clears the shoulder.

It is the principal object of the present invention to provide a stop for valve shank which is simple in construction, can be readily adjusted as desired and which is reliable in use.

It is a further object of the present invention to provide a stop for valve shank which is compact and readily adapted to valves now in use without requiring reconstruction of the valve.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

Figure 1:
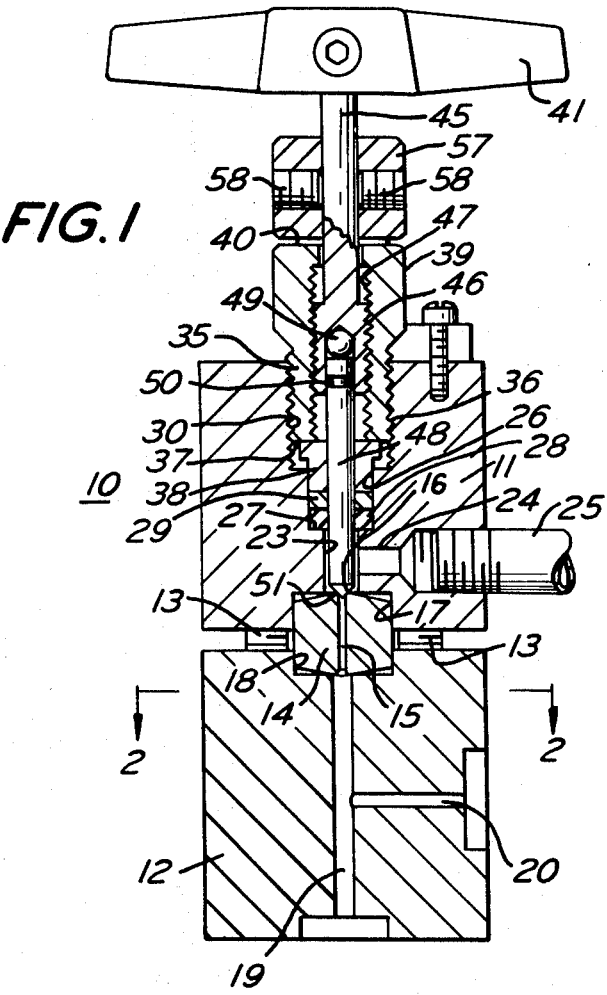
FIG. 1 is a vertical sectional view of a high-pressure valve for fluids embodying the present invention.
Figure 2:
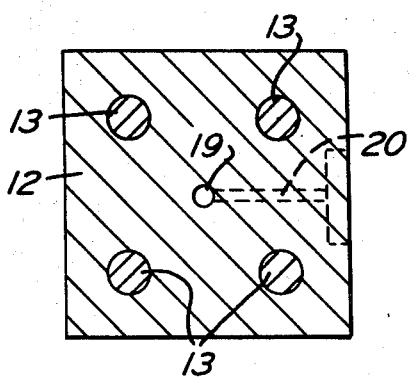
FIG. 2 is a transverse sectional view taken approximately on the line 2-2 of FIG. 1.
Figure 3:
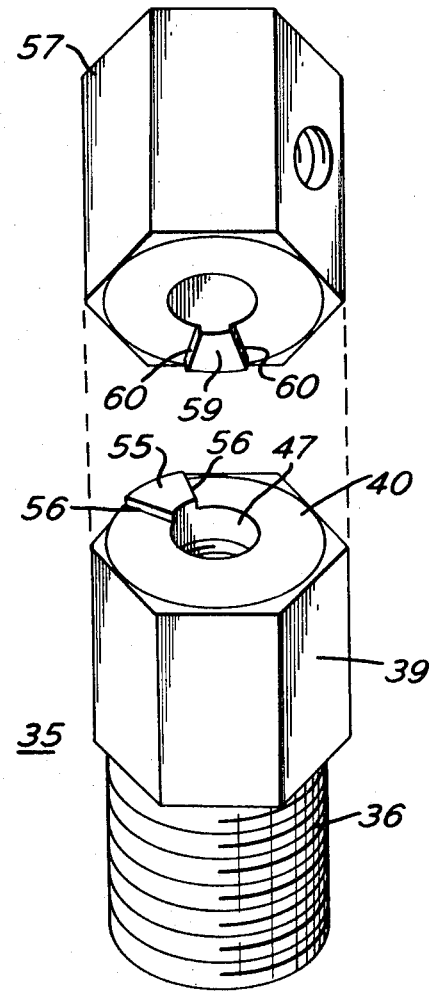
FIG. 3 is an enlarged and exploded perspective view showing a preferred embodiment of the invention.

It should, of course, be understood that the description and drawings herein are illustrative merely, and that various modifications and changes can be made in the structure disclosed without departing from the spirit of the invention.

Like numerals refer to like parts throughout the several views.

DESCRIPTION OF A PREFERRED EMBODIMENT

Referring now more particularly to the drawings, a valve 10 is shown having body portions 11 and 12, clamped together by bolts 13 and with an interposed seat adapter 14 having a passageway 15 therethrough terminating at a seat 16. The seat adapted 14 is seated in a bore 17 in the body portion 11 and in a bore 18 in the body portion 12.

The body portion 12 has a passageway 19, therein with a branch 20, if desired, communicating with the bore 17 and the passageway 15.

The body portion 11 has a bore 23 coaxial with the bore 17 with an intersecting fluid passageway 24 for the connection of a pipe 25.

In axial alignment with the bore 23 an enlarged bore 26 is provided terminating at an abutment shoulder 27 for the reception of an internal washer 28 and packing ring 29.

In axial alignment with the bore 26 an internally threaded bore 30 is provided for the reception of a gland nut 35, having external threads 26 engaging in the threaded bore 30. The gland nut 35 has an inner terminal end 37 engaging an external washer 38 which extends into the bore 26 for compressing the packing ring 29.

The gland nut 35 has an enlarged head 39, preferably hexagonal in shape for engagement by a wrench (not shown) for tightening. The head 39 has an outer transverse terminal face 40.

A valve stem 45 is provided having an operating handle 41. The stem 45 has threads 46 engaged with internal threads 47 in the gland nut 35 for advancing and retracting the valve stem 45.

The valve stem 45 carries a valve rod 48 with a thrust ball 49 interposed therebetween. Retainer balls 50 may be provided for holding the rod 48 in position with respect to the stem 45.

The valve rod 48 extends through the external washer 38, the packing ring 29, the internal washer 28 and the bore 23 and has a terminal end 51 for engagement with the valve seat 16 for cutting off flow.

The valve structure heretofore described is well known and has been included for the purpose of explanation of the present invention. The seating of the valve rod end 51 on the seat 16 cannot be satisfactorily accomplished merely by "feel" as in low-pressure valves, nor can it be satisfactorily preset before pressure is applied on the valve because of dimensional changes which occur upon the application of the high pressure.

In accordance with the present invention, a selected portion of the valve 10, and preferably the outer transverse terminal face 40 of the gland nut 39 is provided with a land or shoulder 55 having longitudinal axial radially disposed end faces 56 either of which can serve as a stop, dependent upon the hand of the threads 46, 47.

A stop collar 57 is provided on the valve stem 45 and can be secured at the desired position of longitudinal adjustment on the stem 45 by one or more setscrews 58.

The stop collar 57 has a land or shoulder 59 thereon in facing relation to the land 55, the land 59 having end faces 60 either of which can engage with one of the end faces 56, dependent upon the hand of the threads 46, 47.

The height of the lands 55 and 59 is preferably the same and is slightly less than the pitch of the threads 46 and 47, so that the first turn of the valve stem 45 will clear the land 59 from engagement with the land 55. Upon subsequent tightening the positioning of the valve stem 45, and accordingly of the valve seating end 51 of the valve rod 48 with respect to the seat 16 will be determined by the engagement of an end face 60 of the shoulder 59 with an end face 56 of the land 55.

It may be noted that the setscrew 58 permits of initial adjustment of the stop collar 57 and its end stop face 60 for proper and controlled seating of the valve rod end 51 on the seat 16, as well as subsequent adjustment occasioned by wear of the valve rod end 51 or of the seat 16.

A simple but effective structure has accordingly been provided for carrying out the objects of the invention.

I claim:

1. In a valve having a valve body with a valve seat and a valve stem with a portion in threaded engagement with a portion of the body and having a valve seating member movable with respect to said seat, the improvement which comprises
  a stop portion carried by said valve body,
  a collar carried by said valve stem and having a stop face for engagement with said stop portion upon turning of said valve stem and thereby limit the engagement of said valve seating member with said valve seat,
  said stop portion being a shoulder having a stop face,
  said valve body having a gland nut, and
  said shoulder being carried by said gland nut.

2. The combination defined in claim 1 in which
said stop portion extends in a direction parallel to the longitudinal axis of the valve stem.
3. The combination defined in claim 1 in which
the dimensions of the engaging portions of said stop portion and said stop collar with respect to the longitudinal axis of the valve stem are less than the pitch of the threads of portions in threaded engagement.
4. The combination defined in claim 1 in which
said collar has a locking member for holding said collar at a selected position on said valve stem.
5. The combination defined in claim 1 in which
said shoulder has a stop face,
said stop face extends in a direction parallel to the longitudinal axis of the valve stem, and
the dimensions of the engaging portions of said stop face and said stop collar with respect to the longitudinal axis of the valve stem are less than the pitch of the threads of the portions in threaded engagement.